United States Patent [19]

Kono et al.

[11] 3,961,202

[45] June 1, 1976

[54] POWER SUPPLY CIRCUIT FOR USE WITH AN ELECTROSTATIC TRANSDUCER

[75] Inventors: Osamu Kono, Tokyo; Noboru Tsuchiya, Yokohama; Atsushi Matsuda, Tokyo; Kiichi Yoshida, Warabi, all of Japan

[73] Assignee: Sony Corporation, Tokyo, Japan

[22] Filed: Nov. 13, 1974

[21] Appl. No.: 523,366

[30] Foreign Application Priority Data

Nov. 15, 1973 Japan ........................ 48-131983[U]

[52] U.S. Cl. .................................. 307/150; 307/46; 179/1 A; 179/2 C

[51] Int. Cl.[2] ............................................ H02J 7/00

[58] Field of Search ............... 307/150, 154, 46, 48; 330/199; 179/1 R, 1 A, 2 C, 100.1

[56] References Cited

UNITED STATES PATENTS

| | | | |
|---|---|---|---|
| 2,377,121 | 5/1945 | Bachman | 179/1 R |
| 3,015,695 | 1/1962 | Claras et al. | 179/1 A |
| 3,048,659 | 8/1962 | Crow et al. | 179/1 A |
| 3,305,638 | 2/1967 | Teachout | 179/1 A |
| 3,848,197 | 11/1974 | Boyd et al. | 330/199 |
| 3,862,367 | 1/1975 | Kono et al. | 179/1 A |

*Primary Examiner*—William A. Shoop
*Attorney, Agent, or Firm*—Hill, Gross, Simpson, Van Santen, Steadman, Chiara & Simpson

[57] ABSTRACT

A first power supply and output circuit and a second power supply and output circuit for use with a microphone unit having an electrostatic transducer and preamplifier transistor is disclosed. DC power to the microphone unit is supplied from the first circuit through a single core cable. An output signal from the microphone unit also passes through the cable to an output transformer in the first circuit. The first circuit has a first battery and the second circuit a DC power source which, when connected to the first circuit, stops drain on the first battery.

8 Claims, 3 Drawing Figures

POWER SUPPLY CIRCUIT FOR USE WITH AN ELECTROSTATIC TRANSDUCER

BACKGROUND OF THE INVENTION

1. Field of the Invention:

The present invention relates generally to power supply and output circuits for use with a microphone, and is directed more particularly to power supply circuits for use with a microphone unit having an electrostatic transducer and a pre-amplifier transistor.

2. Description of the Prior Art:

In an electrostatic transducer, especially a microphone, it is necessary to supply DC voltage to a pre-amplifier formed of a field effect transistor.

In general, a microphone assembly of small size is made of a microphone unit consisting of a diaphragm and a pre-amplifier as one block, a power supply for supplying power to the microphone unit, and a cable for coupling between the two.

There are two methods for supplying power to such a microphone of small size. One of the methods is with a power supply and output circuit having a battery for supplying DC power to the preamplifier in the microphone unit and also having an output transformer to which is fed the microphone output signal. The power and output signal both travel through a single core cable and, in the power supply, the output signal passes through the battery to a signal output terminal. The other method is by use of a system in which an output transformer is included in the microphone unit and the power supply consists primarily of a battery. In this case, the microphone unit is connected to the power supply through a two-core cable and a signal from the microphone proper is delivered to an output terminal of the power supply without passing through a battery.

As mentioned above, in the prior art a single core cable or two-core cable is used in accordance with either but not both of the two power supply systems.

SUMMARY OF THE INVENTION

According to the invention, a pre-amplifier transistor and electrostatic transducer are contained in a microphone unit. A single core cable transfers DC power and an output signal between the unit and a first power supply and output circuit. The output signal from the preamplifier passes through a first battery to the primary of an output transformer. The DC power for the pre-amplifier is generated either by the first battery or through a voltage controlled by a Zener diode which is developed by a second power supply and output circuit.

An object of the present invention is to provide a first power supply and output circuit for use with an electrostatic transducer in which a single core cable is used for connecting to a microphone unit; and a second power supply and output circuit which relieves the drain on a first battery in the first circuit.

Another object of the invention is to provide power supply circuits for use with an electrostatic transducer in which a single core cable is employed for supplying DC power to a microphone unit and also for deriving a signal from the microphone unit. Since no transformer is needed in the microphone unit, it can be light in weight. Also, the single core construction of the cable permits the use of a cable which is thin in comparison to a small size microphone.

A further object of the invention is to provide power supply and output circuits for use with an electrostatic transducer, wherein a DC voltage fed from the second circuit is stabilized in the first circuit by a resistor and constant voltage element connected in parallel to the resistor and then supplied through a single core cable to a microphone unit.

A still further object of the invention is to provide a first power supply and output circuit for use with an electrostatic transducer in which a first battery is connected to the primary side of an output transformer, a capacitor is connected in parallel to the first battery, a second power supply and output circuit is connected to the secondary side of the output transformer, and a single core cable is used to supply DC power to a microphone unit from the first battery or the second circuit.

The other objects, features and advantages of the invention will become apparent from the following description taken in conjunction with the accompanying drawings.

DESCRIPTION OF THE PREFERRED EMBODIMENTS

The present invention will be described below with reference to the drawings.

Figure 1:
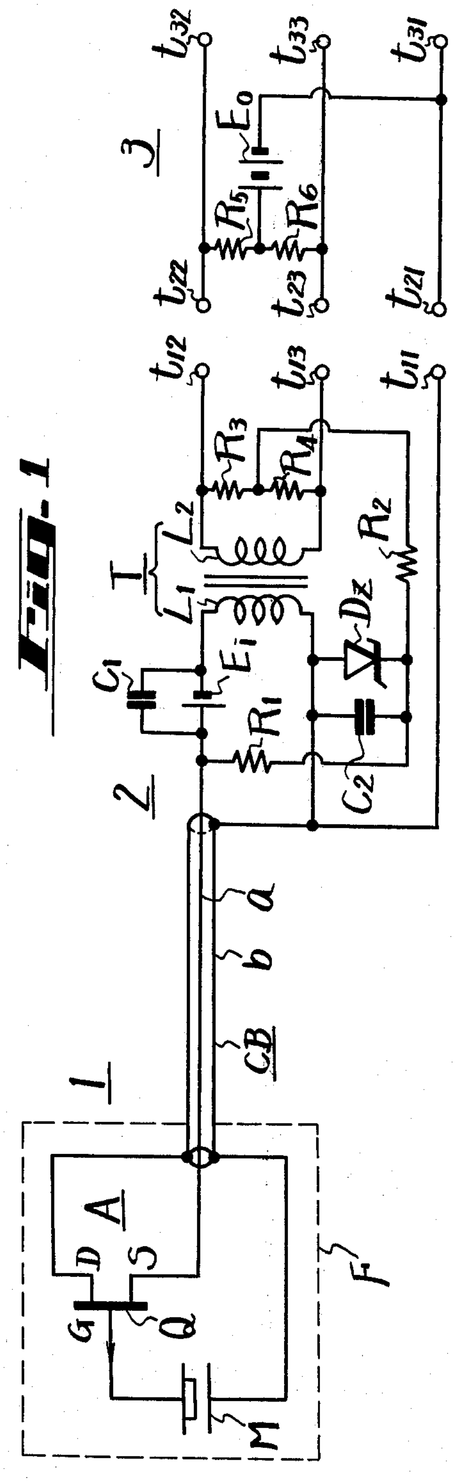
FIG. 1 is a circuit diagram illustrating the use of first and second power supply and output circuits with a microphone unit containing a P channel FET.

A first embodiment of the invention will be described with reference to FIG. 1. In that FIG., reference numeral 1 designates a microphone unit and 2 a first power supply and output circuit. The microphone unit 1 and the first power supply and output circuit 2 are connected by a coaxial cable CB having central conducting element *a* and a concentric outer conducting element b. A second power supply and output circuit 3 is connected to the first power supply and output circuit 2 when the drain on a battery in the first circuit is to be stopped.

The microphone unit 1 will be now described. A microphone capsule M is used as an electrostatic transducer. In the illustrated embodiment, the microphone capsule M is an electret mirophone capsule. A field effect transistor Q forms a pre-amplifier (impedance converter) A and is a P-channel type in the illustrated embodiment. The gate electrode G of the transistor Q is connected to one end of the microphone capsule (which will be hereinafter referred to as a mic-capsule) M. The drain electrode D of the transistor Q and the other end of the mic-capsule M are connected to a coaxial outer conductor *b* of the single core cable CB. The source electrode S of the transistor Q is connected to the core wire *a* of the single core cable CB. The mic-capsule M and the transistor Q are housed in a shield case F which is connected to the outer conductor *b* of the cable CB. An output signal generated by the mic-capsule M is amplified by transistor Q and is transferred along the single core cable CB.

The first power supply and output circuit 2 will be now described. An output transformer T is provided which has a primary winding $L_1$ and a secondary winding $L_2$. A first battery $E_i$ is provided such that its positive electrode is connected to the core wire *a* of the cable CB and its negative electrode is connected to the outer conductor *b* of the cable CB through the primary winding $L_1$ of the output transformer T. A capacitor $C_1$ is connected in parallel to the first battery $E_i$ for serving as a signal transmission path when the first battery $E_i$ is not used. Thus, capacitor $C_1$ should have a low impedance for the output signal. Output terminals $t_{12}$ and $t_{13}$ for the output signal are connected to both ends of the secondary winding $L_2$ of the output transformer T and a ground terminal $t_{11}$ is connected to the outer conductor b of the cable CB.

When the second power supply and output circuit 3 is connected to the first circuit 2, the terminals $t_{12}$, $t_{13}$ and $t_{11}$ are interconnected with terminals $t_{22}$, $t_{23}$ and $t_{21}$ of the second power supply circuit 3, respectively. A series connection of equal resistors $R_3$ and $R_4$ is located between both ends of the secondary winding $L_2$ of the output transformer T and serve to maintain a balance of the voltage at the junction of $R_3$ and $R_4$ with respect to the voltage $E_0$ of the second circuit 3. The connection point between the resistors $R_3$ and $R_4$ is connected to the central conductor a of the cable CB through a series connection of resistors $R_2$ and $R_1$. The resistor $R_1$ serves to supply power to the transistor Q, and its resistance value is selected large relative to the load impedance created by the primary winding $L_1$ of the output transformer T to prevent it from affecting the load. Also, the resistance value of the resistor $R_1$ is selected so that when a Zener diode $D_Z$ and the resistor $R_2$ are selected properly, the voltage between the source electrode S of the transistor Q and ground becomes somewhat higher than the voltage of the first battery $E_i$ due to the relationship between the Zener voltage of the Zener diode $D_Z$ and the drain current of the transistor Q. The junction between the resistors $R_1$ and $R_2$ is connected to the cathode electrode of the Zener diode $D_Z$ as a constant voltage element, and the anode electrode of the Zener diode $D_Z$ is connected to the outer conductor *b* of the cable CB. A capacitor $C_2$ is connected in parallel to the Zener diode $D_Z$ for eliminating noise from the Zener diode $D_Z$ and making its operation stable. The voltage from the second DC power supply and output circuit 3 is made constant by the cooperation of the resistor $R_2$ and Zener diode $D_Z$ and then applied to the microphone unit 1. However, it may be possible to omit the resistor $R_2$ and Zener diode $D_Z$.

The second DC power supply and output circuit 3 has terminals $t_{22}$, $t_{23}$ and $t_{21}$ are connected to $t_{12}$, $t_{13}$ and $t_{11}$ of the first power supply and output circuit 2, respectively. An output signal of the second circuit 3 appears across terminals $t_{32}$ and $t_{33}$. Terminal $t_{31}$ is a ground terminal. A DC power source $E_0$ is provided which can either be a second battery or a fixed power supply connected to an AC line soruce. The negative terminal is connected to the terminal $t_{31}$ and a series connection of resistors equal $R_5$ and $R_6$ is connected between the terminals $t_{22}$ and $t_{23}$ to serve as a balance network. The anode electrode of the DC power source $E_0$ is connected to the junction between the resistors $R_5$ and $R_6$.

Operation of the power supply circuit shown in FIG. 1 will now be described. When the second power supply and output circuit 3 is not used, the DC power from the first battery $E_i$ is applied through the coaxial cable CB and transformer primary $L_1$ to the transistor Q of the microphone unit 1. Simultaneously, a signal from the microphone unit 1 is supplied to the primary side of the output transformer T through the cable CB and first battery $E_i$. Thus, an output signal is obtained across the terminals $t_{12}$ and $t_{13}$ after the impedance is converted by the transformer T (the output impedance is lowered).

As previously mentioned, the pre-amplifier A forms an impedance converter. The mic-capsule M connected between the gate G and drain D of transistor Q provides an output signal applied to the gate of transistor Q as a control voltage. The primary winding $L_1$ of transformer T connected in series with power source $E_i$ represents an output load for transistor Q. Consequently, the gate controlled channel impedance between the drain D and source S creates the amplified output signal which appears across winding $L_1$.

When the second circuit 3 is connected to the first circuit 2, a DC voltage from the power source $E_0$ is made constant by the circuit consisting of the Zener diode $D_Z$ as a constant voltage element and the resistor $R_2$ and is coupled by resistor $R_1$ to the cable CB and the microphone unit 1. In this case, the first battery $E_i$ is reverse biased and hence looses its function as a battery. A signal from the microphone unit 1 is delivered between the terminals $t_{32}$ and $t_{33}$ through the first battery $E_i$ when it is connected or through the capacitor $C_1$ when the battery $E_i$ is not connected.

Another embodiment of the present invention will now be described with reference to FIG. 2, in which reference numerals for the same elements are the same as those of FIG. 1.

Figure 2:
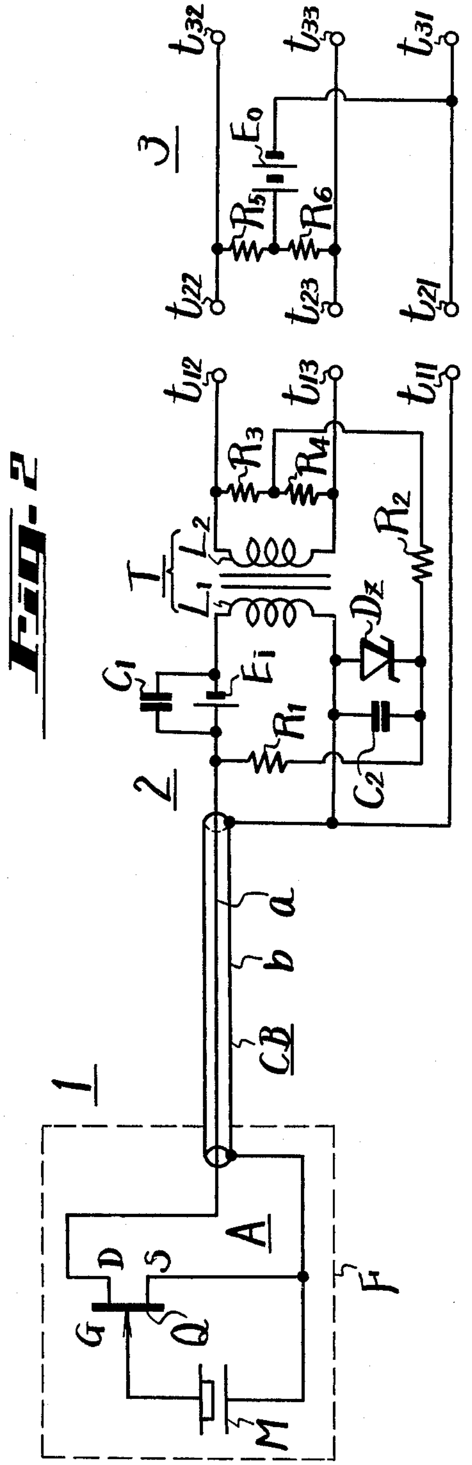
FIG. 2 is a circuit diagram illustrating the use of the first and second circuits with an N channel FET.

In the embodiment of FIG. 2, an N-channel type field effect transistor is used as the transistor Q which forms the preamplifier (impedance converter) A of the microphone unit 1. The drain electrode D of the transistor Q is connected to the central conductor *a* of the cable CB, its gate electrode G is connected to one end of the mic-capsule M, and the other end of the mic-capsule M and the source electrode S of the transistor Q are connected together to the outer conductor *b* of the cable CB. The circuit construction of the first power supply and output circuit 2 and the second power supply and output circuit 3 is substantially the same as that of FIG. 1 and hence their descriptions will be omitted.

A further embodiment of the present invention will now be described with reference to FIG. 3, in which reference numerals for the same elements are the same as those of FIGS. 1 and 2.

Figure 3:
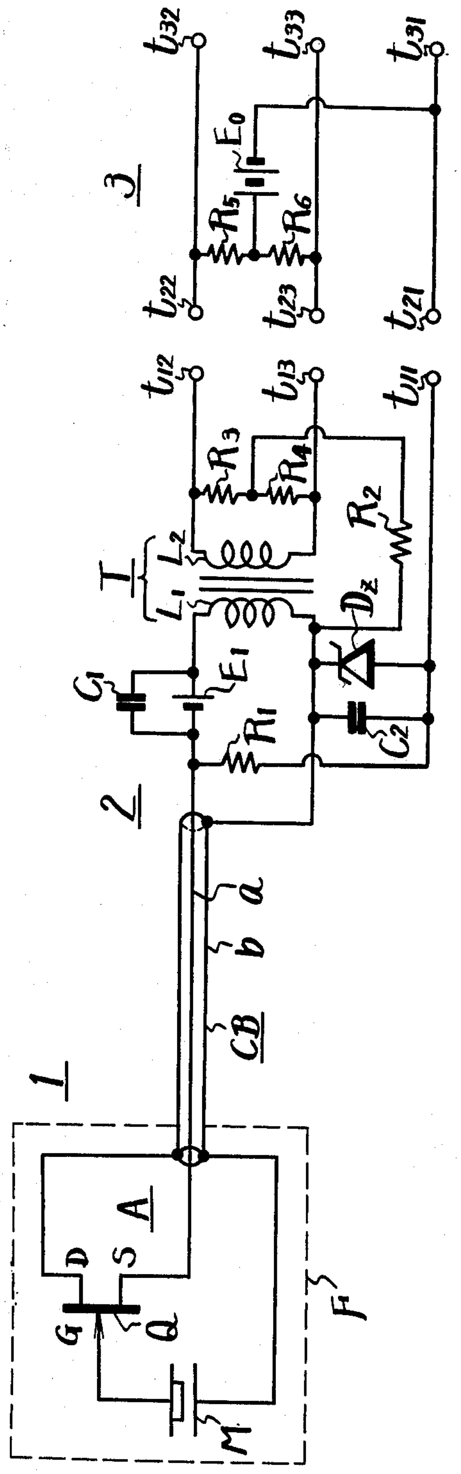
FIG. 3 is a circuit diagram illustrating the use of the first and second circuits with an N channel FET wherein a DC voltage from the second circuit is fed at the bottom of the output transformer primary.

In the embodiment of FIG. 3, an N-channel type field effect transistor is employed as the transistor Q which forms the pre-amplifier (impedance converting circuit) A of the microphone unit 1. In this embodiment, the source electrode S of the transistor Q is connected to the central conductor a of the cable CB, its gate electrode G is connected to one end of the mic-capsule M, and the other end of the mic-capsule M and the drain electrode D of the transistor Q are connected to the outer conductor b of the cable CB.

The circuitry of the first and second power supply and output circuits in FIG. 3 is similar to the embodiment of FIG. 2, with one exception. The DC voltage from the second circuit is connected through the resistor $R_2$ between the secondary side of the output transformer and ground so that the outer conductor, rather than the inner conductor of the cable CB is positive. With this arrangement, the first battery $E_i$ is reversed.

When the second circuit is connected to the output transformer, the DC power is supplied to the microphone unit 1 through the resistor $R_2$ and cable CB and returned to ground through $R_1$. With this embodment, as with the others, either the first battery or the DC power source can be used to supply power to the pre-amplifier.

In the above description, the electret capsule is used as the mic-capsule or the electrostatic transducer, but a condenser mic-capsule (which requires polarization) can also be used.

It will be apparent that many modifications and variations could be effected by one skilled in the art without departing from the spirit or scope of the novel concepts of the present invention.

We claim as our invention:

1. A power supply and output circuit for use with an electrostatic transducer having an amplifier, comprising:

a. an electrostatic transducer;

b. an amplifying device connected to said transducer;

c. a first circuit serving both as a power supply and an output circuit comprising first portable power means for supplying DC power to said amplifiying device, an output transformer for receiving a signal derived from said amplifier through said first power means, said transformer having primary and secondary windings, said primary winding being connected to said first power means and said secondary winding being connected to output terminals of said transformer;

d. a coaxial cable having a single central conductor and an outer conductor, said cable being connected between said amplifier and said first circuit;

e. a second circuit serving both as a power supply and output circuit to be connected to said first circuit; and f. resistor means connected between one of the conductors of said coaxial cable and output terminals of said transformer for serving as a DC power path when said second circuit is connected to said first circuit.

2. A power supply and output circit for use with an electrostatic transducer as claimed in claim 1, further comprising a capacitor connected in parallel to said first power means.

3. A power supply and output circuit for use with an electrostatic transducer as claimed in claim 1, further comprising a constant voltage element connected between said resistor means and the outer conductor of said coaxial cable.

4. A power supply and output circuit for use with an electrostatic transducer as claimed in claim 3, in which said constant voltage element is a Zener diode and a capacitor is connected in parallel to said Zener diode for absorbing a noise.

5. A power supply and output circuit for a microphone unit comprising in combination:

a. a microphone unit having an electrostatic transducer connected to a pre-amplifier transistor;

b. a coaxial cable with a single central conductor and an outer conductor, said cable having one end connected to said pre-amplifier transistor;

c. a first power supply and output cirucit connected to the other end of said cable, said first circuit comprising an output transformer having one end of a primary winding connected through a battery to the central conductor of said cable and the other end connected to said outer conductor, the secondary winding of said output transformer being connected to output terminals, a signal bypass capacitor across said battery, a first resistor connected between said central conductor and one end of a Zener diode, the other end of said Zener diode being connected to said outer conductor, a noise capacitor across said diode, said first resistor and Zener diode also being connected to a second resistor, the other end of said second resistor being connected through third and fourth resistors to said secondary winding of said output transformer and a reference terminal connected to said cable outer conductor; and d. a second power supply and output circuit having signal input terminals connected to said output terminals of said first circuit, said second circuit comprising fifth and sixth resistors series connected between said signal input teminals, and a DC power source connected between the reference terminal and the connection of said fifth and sixth resistors.

6. A power supply and output system for a microphone unit, comprising:

a. a microphone unit having an electrostatic transducer connected to a semiconductor amplifying device;

b. a coaxial cable having a single central coductor and an outer conductor, said cable having one end connected to said amplifying device;

c. a first power supply and output circuit having a portable power source connected to the central conductor of said cable, an output transformer primary winding connected between said portable power source and outer cable conductor, a secondary of said output transformer being connected to first resistor means, said first resistor means also connecting to the central conductor of said cable to couple power for the amplifying device thereto; and d. a second power supply and output circuit having first and second detachable connections to the output transformer secondary and a third detachable connection to said cable outer conductor, a second resistor means connected to said first and second detachable connections, and a power source connected between said second resistor means and said third detachable connection.

7. The system of claim 6 in which voltage regulation and filtering means are connected between said first resistor means and said cable outer conductor.

8. The system of claim 6 in which a capacitor is connected in parallel with said portable power source.

* * * * *